United States Patent
Chadwick

(10) Patent No.: US 9,706,515 B1
(45) Date of Patent: Jul. 11, 2017

(54) LOCATION DATA FROM MOBILE DEVICES

(71) Applicant: Vistar Media Inc., New York, NY (US)

(72) Inventor: Mark Chadwick, Philadelphia, PA (US)

(73) Assignee: Vistar Media Inc., New York, NY (US)

( * ) Notice: Subject to any disclaimer, the term of this patent is extended or adjusted under 35 U.S.C. 154(b) by 113 days.

(21) Appl. No.: 14/688,756

(22) Filed: Apr. 16, 2015

Related U.S. Application Data

(60) Provisional application No. 61/981,095, filed on Apr. 17, 2014.

(51) Int. Cl.
*H04W 24/00* (2009.01)
*H04W 64/00* (2009.01)
*H04W 8/20* (2009.01)
*H04W 4/02* (2009.01)

(52) U.S. Cl.
CPC .............. *H04W 64/00* (2013.01); *H04W 4/02* (2013.01); *H04W 8/20* (2013.01)

(58) Field of Classification Search
CPC .............................. H04W 64/00; H04W 24/00
USPC ............................................. 455/456.1–456.6
See application file for complete search history.

(56) References Cited

U.S. PATENT DOCUMENTS

| | | | |
|---|---|---|---|
| 2008/0188237 A1* | 8/2008 | Alles | G01S 5/021 455/456.1 |
| 2013/0260782 A1* | 10/2013 | Un | H04W 64/00 455/456.1 |
| 2013/0310066 A1* | 11/2013 | Shu | H04W 64/00 455/456.1 |

* cited by examiner

*Primary Examiner* — Joshua Schwartz
(74) *Attorney, Agent, or Firm* — Fenwick & West LLP

(57) ABSTRACT

A location correction system receives a reported location of a mobile device. A set of possible geographic locations for the mobile device is determined based at least in part on the reported location and a device density map describing a historical distribution of mobile devices over a geographic region. A probability is determined for each location in the set of possible geographic locations, each probability indicating a likelihood that an associated possible geographic location represents a true location of the mobile device. Responsive to the determined probabilities, a possible geographic location in the set is selected. A true location of the mobile device is published based at least in part on the selected possible geographic location.

17 Claims, 5 Drawing Sheets identified cell site → identified cell region historical location of device B @t1
historical location of device A @t1 historical location of device B @t2
historical location of device A @t2

LOCATION DATA FROM MOBILE DEVICES

CROSS-REFERENCE TO RELATED APPLICATION

This application claims the benefit of U.S. Provisional Application No. 61/981,095, filed Apr. 17, 2014, which is incorporated by reference in its entirety.

TECHNICAL FIELD

This disclosure relates generally to the mobile location data field, and more specifically to location correction in the mobile location data field.

BACKGROUND

The accuracy of mobile location data is becoming increasingly more important with the increased popularity of mobile advertisements and location-based social platforms. However, the quality of mobile location data varies drastically from record to record. Aside from the wide variety of mobile devices (and the attendant location inaccuracies) that are used by the target population, each user can additionally select whether or not to use secondary location services, such as GPS or WiFi triangulation, to increase the accuracy of the reported location. For example, a smartphone can report a highly accurate location (e.g., accurate within a meter or two) when the on-board GPS radio is turned on, but reports only the location of the cell site to which the phone is connected when the GPS radio is turned off, allowing the margin of error to grow to hundreds of meters.

Furthermore, location data supplied by mobile service providers conventionally tend to be inaccurate, which leads to inaccurate device location estimation, absent a native application installed on the device. The inaccurate location data can subsequently result in inaccurate advertisements or other location-based services that are provided to the given device. The location determined by the mobile service provider can be inaccurate due to the capabilities of the cell tower, due to rounding or truncation errors (e.g., a longitude of −75.180817 is truncated to −75.1), due to a lack of secondary location data (e.g., GPS, WiFi triangulation, etc.), or due to any other suitable process that introduces location inaccuracy to the data. The device location determined by the mobile service provider can lack secondary location data because the mobile service provider does not collect or process the secondary location data, because the mobile service provider does not transmit or release the secondary location data (e.g., the mobile service provider has a native application on the device that collects the secondary location data but the service provider maintains the secondary location data as proprietary), because the user did not activate the secondary location data functionality or restricts secondary location data collection by the mobile service provider, or for any other suitable reason.

SUMMARY

The above and other needs are met by a computer-implemented method, a non-transitory computer-readable storage medium storing executable code, and a device for correcting location data associated with a mobile device.

One embodiment of the computer-implemented method for correcting location data, comprises receiving a reported location of a mobile device, and determining a set of possible geographic locations for the mobile device based at least in part on the reported location and a device density map describing a historical distribution of mobile devices over a geographic region. A probability is determined for each location in the set of possible geographic locations, each probability indicating a likelihood that an associated possible geographic location represents a true location of the mobile device. Responsive to the determined probabilities, a possible geographic location in the set is selected. A true location of the mobile device is published based at least in part on the selected possible geographic location.

In another embodiment a non-transitory computer-readable storage medium storing executable computer program instructions for correcting location data, comprises receiving a reported location of a mobile device, and determining a set of possible geographic locations for the mobile device based at least in part on the reported location and a device density map describing a historical distribution of mobile devices over a geographic region. A probability is determined for each location in the set of possible geographic locations, each probability indicating a likelihood that an associated possible geographic location represents a true location of the mobile device. Responsive to the determined probabilities, a possible geographic location in the set is selected. A true location of the mobile device is published based at least in part on the selected possible geographic location.

In yet another embodiment a location correction system, that comprises a processor configured to execute instructions stored on a non-transitory computer-readable storage medium. The instructions when executed by a processor, cause the system to receive a reported location of a mobile device, and determine a set of possible geographic locations for the mobile device based at least in part on the reported location and a device density map describing a historical distribution of mobile devices over a geographic region. The system determines a probability for each location in the set of possible geographic locations, each probability indicating a likelihood that an associated possible geographic location represents a true location of the mobile device, and selects a possible geographic location in the set responsive to the determined probabilities. The system then publishes a true location of the mobile device based at least in part on the selected possible geographic location.

DESCRIPTION OF THE PREFERRED EMBODIMENTS

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

A location correction system using a large corpus of historical positional information detects and probabilistically corrects inaccurate reported locations of devices. The location correction system uses the historical data to build a model describing accuracy of positional data. The location correction system may use the model to, e.g., determine that a position reported by a device has fallen outside the bounds of an accurate location model. Additionally, the location correction system may use that model along with a location history of the device to estimate its true location.

Figure 1:
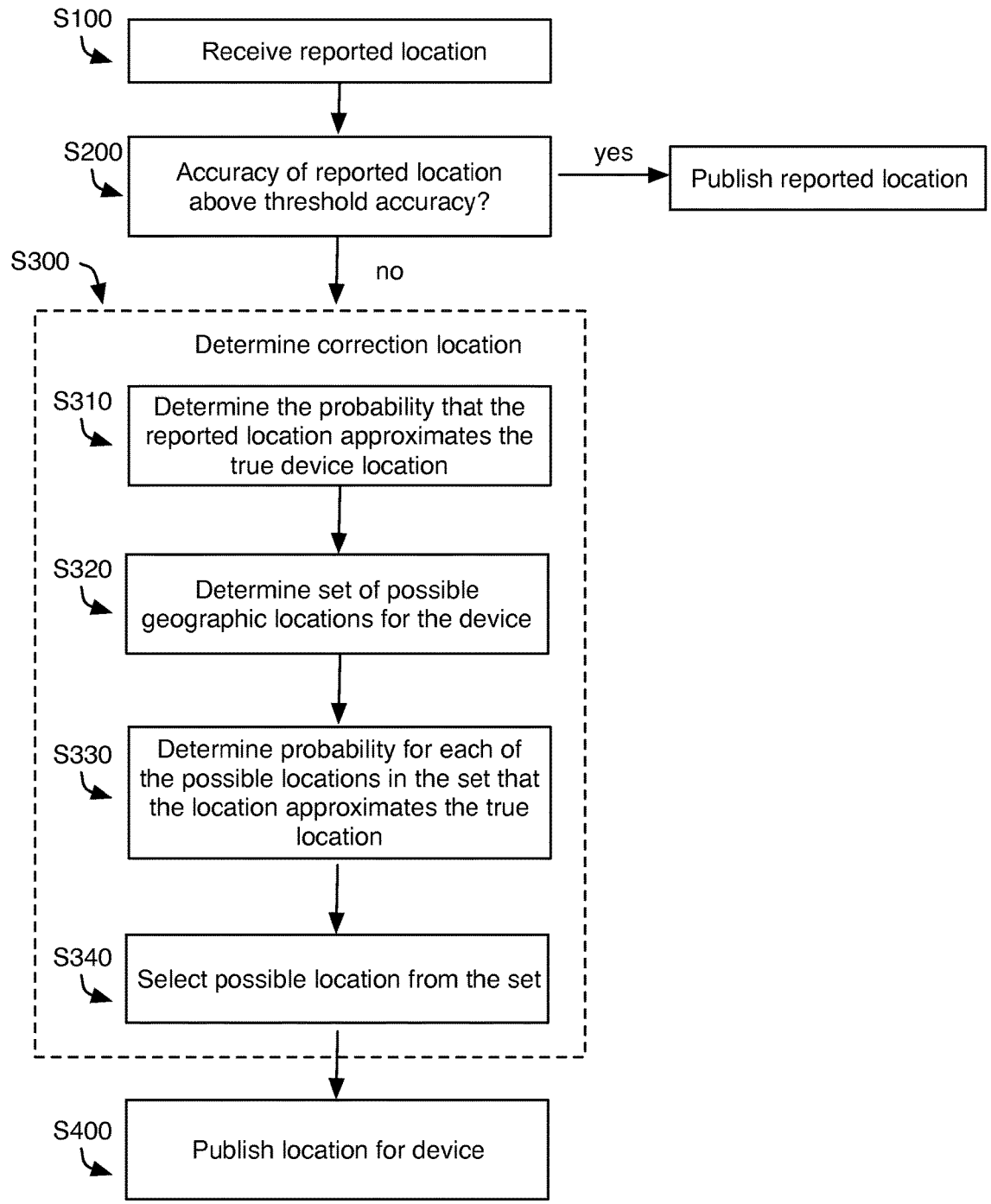
FIG. 1 is a schematic representation of the method of location correction, according to an embodiment.

FIG. 1 is a flowchart illustrating a process for correcting location data according to one embodiment. In one embodiment, the process of FIG. 1 is performed by a location correction system. Other entities may perform some or all of the steps of the process in other embodiments. Likewise, embodiments may include different and/or additional steps, or perform the steps in different orders.

As shown in FIG. 1, the method for correcting location data includes receiving a reported location for a device S100; determining whether the accuracy of the reported location is below a threshold accuracy S200; in response to determination that the reported location has an accuracy below a threshold accuracy, determining a correction location S300 by: determining the probability that the reported location approximates the true device location S310, determining a set of possible geographic locations for the device S320, determining the probability for each of the possible locations in the set that the location is the true location of the device S330, and selecting the possible location within the set having the highest probability, wherein the highest probability is a second probability S340; and publishing a location for the device S400. The method can additionally include generating an anomalous region map; generating a device density map S500; and generating a probability tree S600.

This method preferably leverages high accuracy historical device location data from one or more third party sources (e.g., mobile service providers, social networking systems, etc.) to estimate a high-resolution location for a device, given low-resolution location data. More preferably, this method turns low-accuracy device location data into a high accuracy device location based on the high accuracy historical location data. This method can additionally leverage the fine-grained device location data from a first source (e.g., a first phone service provider) to estimate a location for a given device supported on a second phone service provider.

Fine-grained (e.g., high accuracy) device location data is preferably location data having an accuracy above a predetermined threshold. Examples of high accuracy device location data can include location data having an uncertainty range below a threshold radius (e.g., less than a 1 meter radius), location data having secondary location data (e.g., GPS, WiFi triangulation, etc.), location data identified using a specific location tracking technique (e.g., GPS), location data identified using a plurality of different mobile phone tracking techniques, location data verified by a first and second location recording method, or any other suitable location data having a high accuracy.

Figure 2:
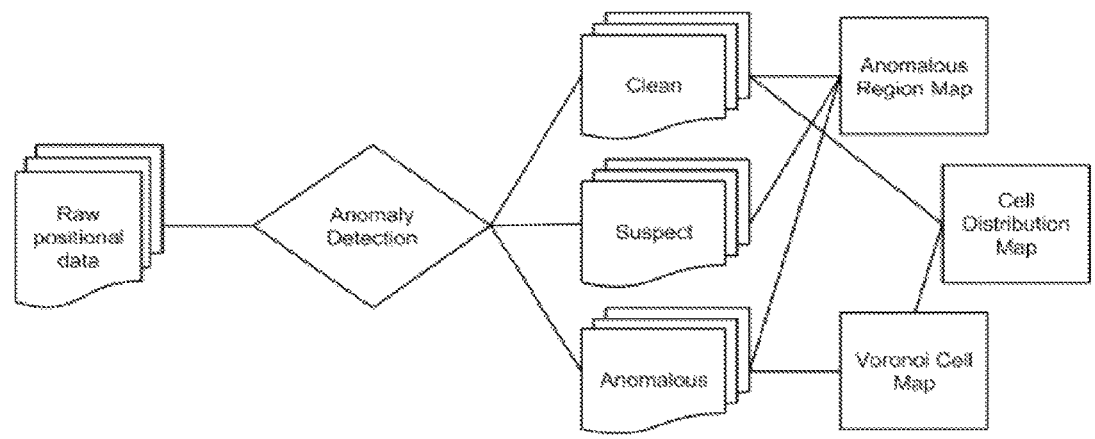
FIG. 2 is a schematic representation of the location correction system, according to an embodiment.

The method is preferably used with a location correction system (for example, as shown in FIG. 2) to correct a reported location for a device. FIG. 2 is a schematic representation of the location correction system, according to an embodiment. Turning back to FIG. 1, more preferably, the method is used to correct a reported device location for a mobile advertising exchange, but can alternatively be used to correct a location for a social media post, or for any other suitable application. This method preferably utilizes a source dataset from a cell service provider (e.g., mobile operator), but can alternatively utilize a source dataset from a social networking system, an application, or a source dataset from any other suitable source. The source dataset preferably includes location data generated using network-based techniques (e.g., cell identification, triangulation, forward link timing methods, etc.), but can additionally include secondary location data, including data generated using handset-based techniques (e.g., using cell identification, neighboring cell triangulation, GPS, WiFi triangulation, etc.), SIM-based techniques, hybrid positioning systems, or any other suitable location means.

The method preferably receives the reported location from the mobile service provider, but can alternatively receive the reported location from the device or an intermediary source, such as an advertisement exchange. In some embodiments, the reported location includes a geographic location identifier and a margin of error. The geographic location identifier is preferably a set of latitude and longitude coordinates, but can alternatively be a venue name, a cell site identifier, or any other suitable geographic location identifier. The margin of error may be a distance indicative of a radius of uncertainty, but can alternatively be a confidence score or any other suitable indication of error. The reported location can be determined from a primary location data field, such as a cell site data field of a reported location or any other suitable network-based mobile phone tracking method. Alternatively, the reported location can be determined from a secondary location data field, such as a GPS coordinate data field, a WiFi triangulation data field, a hybrid positioning system data field, or any other suitable data field. The secondary location data is preferably preferentially reported over primary location data (e.g., cell site location), but primary location data can alternatively be preferentially reported over secondary location data. A given type of secondary location data can be preferentially reported over others (e.g., GPS can be preferentially reported over all other forms of secondary data), or the reported location can be determined from (e.g., calculated from, checked by, etc.) an aggregation of multiple types of secondary location data.

The device for which the location is determined is preferably a mobile device, such as a cell phone, smart phone, tablet, laptop, or any other suitable mobile device. The device preferably includes a radio configured to communicate with a cell site (e.g., cell tower, base station, etc.), an input, and a display. The device can additionally include a GPS radio, a WiFi radio, a camera, or any other suitable mechanism from which a location can be determined. Each device is preferably identified by a unique device identifier (e.g., globally unique device identifier or encrypted device identifier) that is consistent across data records relating to the device, but can alternatively be identified by a non-unique identifier (e.g., SIM card identifier, phone number, mobile device model number, etc.).

Figure 5A:
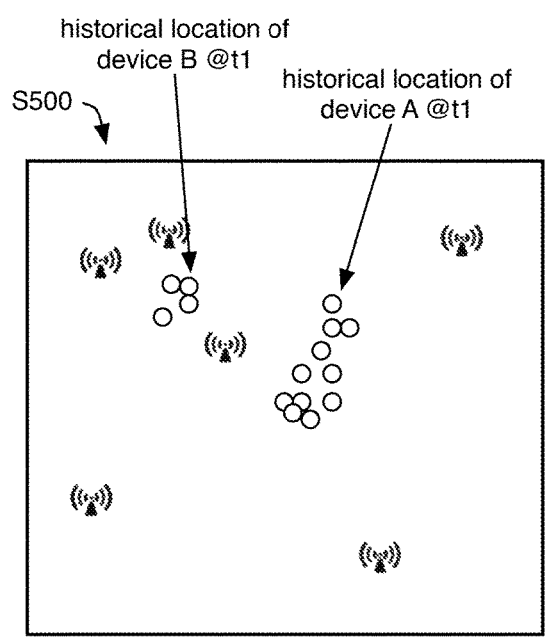
FIGS. 5A and 5B are schematic representations of examples of a device density map for a first and second time period, respectively, according to an embodiment.
Figure 5B:
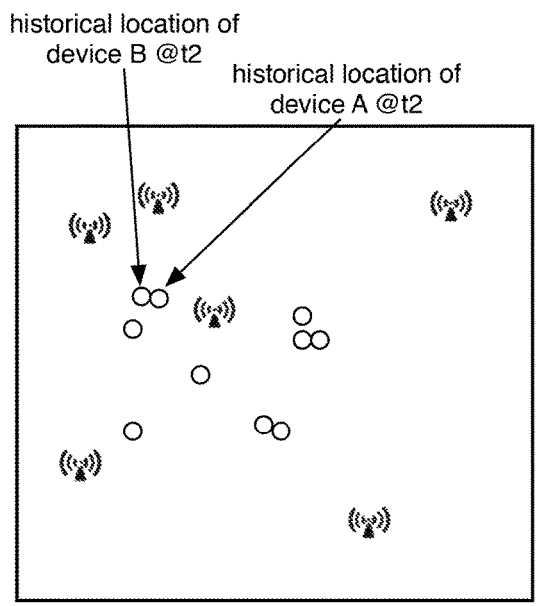

A device density map used with the method preferably functions to display the historical device distribution over a geographic region for a given time period. The device density map is preferably subsequently used to determine how likely it is for a device to be in the reported location or the cell (e.g., region) encompassing the reported location. For example, if the device density map that is associated with the time at which the location was reported shows that a dense concentration of devices was historically located at the reported location, then the probability that the reported location was correct is preferably a high probability. More preferably, the device density map displays the density or number of devices within a set of device density cells for a given time point or period of time. Each of the set of virtual device density cells preferably defines a discretized geographic region. Each of the set of device density cells is preferably the same, but can alternatively have different shapes and sizes. The set of device density cells preferably cooperatively encompass the overall geographic region, but can alternatively encompass a subset of the geographic region. The device density cells preferably do not overlap (e.g., encompass a common geographic point), but can alternatively overlap. The device density cell is preferably a cell defined within a virtual lattice graph overlaid on a geographic region, but can alternatively be the cell defined by the Voronoi tessellation map, or be any other suitable geographic region. For example, in a device density cell encompassing a stadium and a parking lot, the device density map corresponding to a given time can indicate a first density or frequency of devices located within the stadium and a second density or frequency of devices located within the parking lot, wherein the second density or frequency can be lower than the first density or frequency (e.g., less than half, a third, or any other suitable fraction of the first density). A request for a device known only to be within the cell can subsequently be assigned the stadium location instead of the parking lot location. Alternatively, the location device can be randomly selected, selected based on the distribution of historical device densities across the cell (e.g., wherein the probability of location assignment as the device location can be correlated with the density or frequency of historical devices located at the respective location), or otherwise selected. The device density map preferably additionally includes the distribution of devices over the displayed region for a given time period (e.g., time of day, day of week, month, season, etc.). FIGS. 5A and 5B are schematic representations of examples of a device density map for a first and second time period, respectively, according to an embodiment. The device density map is preferably generated from the source dataset, wherein generating the device density map S500 preferably includes plotting data points satisfying the time constraint on the map, an example of which is shown in FIGS. 5A and 5B. More preferably, the device density map is preferably generated from historically reported locations having an accuracy score above a threshold level.

A tower region map preferably includes a map identifying the locations of cell sites (e.g., base stations or cell towers). The tower region map is preferably determined from a source dataset including historical device locations for a plurality of devices. The source dataset is preferably received from the third party site, but can alternatively be received from a mobile service provider or any other suitable source. The cell sites and cell regions can be determined from the entirety of the source dataset, but can alternatively be determined from a subset of the source dataset, such as from the location data of the dataset having accuracies above or below a threshold value, the location data of the dataset having the minimum accuracy, known anomalous data points of the source dataset, or from any other suitable subset of the source dataset. The geographic points or regions having device densities above a threshold density or number are preferably marked as a cell site. This functions to leverage the assumption that coarse tower triangulation and digit truncation behave similarly, and cause a set of points which should have a continuous distribution over a geographic region to clump abnormally into small geographic areas (e.g., a single geographic point). These points are preferably marked as the cell tower sites, and subsequently used to determine the geographic region associated with the given cell tower within the tower cell map. Alternatively, the cell sites can be determined from a mobile service provider map or list or determined from the source dataset, as described below. The tower region map can additionally include the cells, or regions, covered by each of the cell sites, wherein the regions are preferably non-overlapping polygons, but can alternatively have any other suitable shape. The regions can be received from a user (e.g., drawn), determined from a mobile service provider map, or determined from the source dataset, as described below. However, the regions can be otherwise determined. The regions preferably do not overlap with adjacent regions (e.g., encompass a common geographic point), and abut against adjacent regions to substantially cover a geographic region, but can alternatively overlap.

Figure 3:
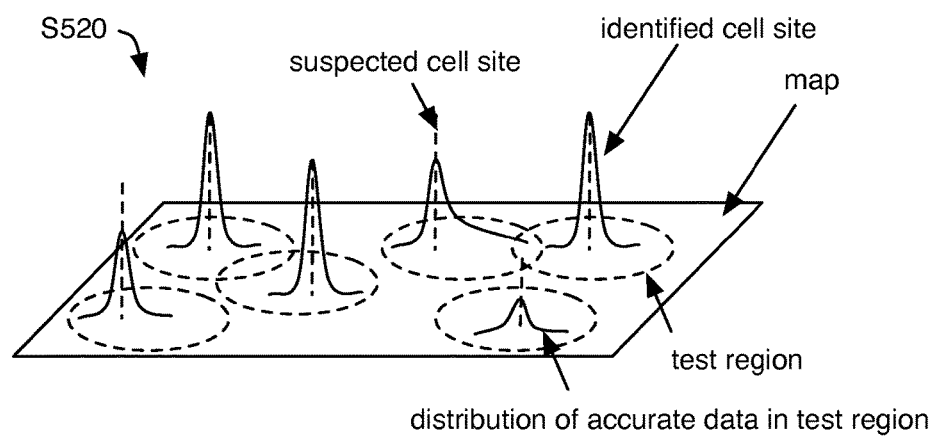
FIG. 3 is a schematic representation of an example of determining the location of cell sites, according to an embodiment.

FIG. 3 is a schematic representation of an example of determining the location of the cell sites, according to an embodiment. As shown in FIG. 3, determining the location of the tower cell sites based on the source dataset S520 preferably includes grouping the data points within the dataset into test regions, identifying locations within each region having a proportion of data points above a threshold proportion (e.g., a geographic point associated with at least 90% of the records within the region), and marking the identified locations as a cell site. However, the cell sites can be determined based on the source dataset in any other suitable manner. A different tower region map can be determined for each device density map time interval, or can be time agnostic. The location of the cell sites are preferably substantially constant across device density maps for a plurality of times (e.g., wherein the tower region map is determined from the device density maps), but can alternatively change locations between a device density map for a first time and a device density map for a second time. The test regions are preferably non-overlapping, but can alternatively overlap. The test regions are preferably polygonal, but can alternatively be any other shape describing an area. The test regions preferably cover the same or substantially similar total area (e.g., each test region covers 1 acre), but can alternatively have different areas. The test regions are preferably substantially identical in shape and area, but can alternatively vary. The threshold proportion for a location to be identified as a cell site is preferably 90%, but can alternatively be higher or lower. Determining the location of the cell sites can additionally include identifying secondary locations within each region having a proportion of data points above a second threshold proportion, lower than the first threshold proportion, and marking the secondary locations as suspected cell sites. Determining the location of the cell sites can additionally include segmenting the records by carrier or by any other suitable parameter. Determining the location of the cell sites can additionally include comparing the device density map with the nearest tower region (e.g., tower cell) to determine whether a cluster of records constitutes a tower (e.g., constitutes bad data) or a gathering of devices (e.g., constitutes good data).

Figure 4:
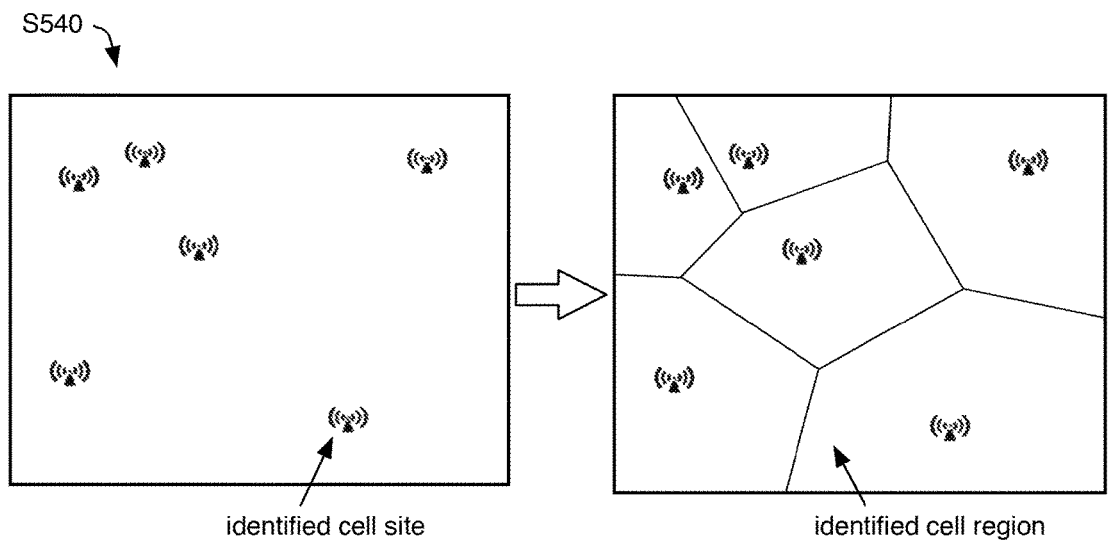
FIG. 4 is a schematic representation of an example of determining cell regions, according to an embodiment.

FIG. 4 is a schematic representation of an example of determining cell regions, according to an embodiment. Determining the cell regions based on the source dataset S540 preferably includes dividing the map region into a number of cell regions, wherein each cell region encloses a cell site, as determined from the source dataset. The cell region is preferably constant across tower region maps corresponding to multiple times, but can alternatively vary (e.g., change location, be larger, or be smaller) for tower region maps corresponding to different times. The map region can be divided into cell regions by using Voronoi tessellation, as shown in FIG. 4, wherein the cell sites function as the seeds (e.g., sites or generators). Alternatively, the map region can be divided into cell regions by a user, divided into cell regions based on geographical features, divided by connecting anchor points (e.g., points through which a boundary extends), or divided into cell regions in any other suitable manner.

An anomalous region map used with the method includes a set of geographic locations, each associated with a probability or other suitable measurement of how likely a reported location is the true device location. In other words, the anomalous region map can be used to determine how anomalous a record is at a given geographic point, based on historical records. For example, a geographic location identifying a cell site can be associated with a low probability that the reported location is the true device location. In another example, the geographic location identifying a location distal to a cell site can be associated with a high probability that the reported location is the true device location. The anomalous region map is preferably determined from the source dataset including historical device locations for a plurality of devices that was used to determine the tower region map, but can alternatively be generated using any other suitable dataset. More preferably, the anomalous region map is determined from the entirety of the data set, but can alternatively be determined from the data used to determine the tower region map, the high-accuracy data used to determine the device density map, or any other suitable data from the source dataset.

Generating the anomalous region map preferably includes plotting the data points on a map and assigning an anomaly score for each geographic location point. The anomaly score is preferably for a geographic location, but can alternatively be determined for a data point within the dataset. The anomaly score for each geographic location is preferably used to categorize locations. More preferably, the anomaly scores are used to identify anomalous locations, suspect locations, and/or clean locations. Anomalous locations are preferably locations that, if reported by a device, have a low probability of being the actual device location. In one variation of the method, anomalous locations are geographic locations having anomaly scores above a first threshold, suspect locations are locations having anomaly scores below the first threshold and/or above a second threshold lower than the first threshold, and clean locations are locations having anomaly scores lower than the second threshold. However, clean, suspect, and anomalous locations can be otherwise determined. Suspect locations are preferably locations having an anomaly score above a predetermined threshold. However, suspect locations and the associated probability can be determined in any other suitable manner.

The anomaly score is preferably a scalar, but can alternatively be a percentage or any other suitable score. The geographic location is preferably a point (e.g., a latitude/ longitude combination), but can alternatively be a region (e.g., an area inclusive of one or more latitude/longitude combinations), or any other suitable geographic area. The geographic location anomaly score can be calculated based on the device location data point anomaly score, but can alternatively be calculated based on the traversed paths of devices through the cell regions, based on the density of historic device locations mapped to the individual geographic location and/or adjacent geographic locations, or based on any other suitable parameter.

The device location data point anomaly score can be calculated based on the reported uncertainty of the device location data point, but can alternatively or additionally be calculated based on the type of location technology used to determine the location data (e.g., wherein the location data can be tagged with the technology that generated the data), or calculated in any other suitable manner. For example, the anomaly score for a first record can be assigned a lower value or decreased in response to determination that the data was derived from GPS, whereas the anomaly score for a second record can be assigned a higher value or increased in response to determination that the data was derived from cell identification. In another example, the anomaly score for a geographic location can be calculated based on the number of reported data points having locations at the geographic location, weighted by the anomaly score for each of the data points. In another example, the anomaly score for the geographic location can be determined based on the number or percentage of devices having high anomaly scores reporting the geographic location, assigned in response to the number or percentage of devices having high (or low) anomaly scores surpassing a predetermined threshold number or percentage, or determined in any other suitable manner.

The geographic location anomaly score can additionally or alternatively be calculated based on the traversed path of a given device, as determined from historical device location points for the device. The data points within the source dataset are preferably grouped by the device identifier, and the data points for each device identifier is preferably mapped to a tower region map, such that the traversal path of the given device through the cell site regions is identified. The anomaly score is preferably calculated based on the deviation from a traversal path of a known device (e.g., a device having an accuracy score above a predetermined threshold) through the cell site regions, wherein the traversal path can function as a reference path. In one variation, a set of data points within the source dataset for a device having location data above a threshold accuracy is mapped to the tower region map to build a signature. In response to receipt of a data point having an accuracy below the threshold accuracy, the historical set of data points for the device identifier associated with the low-accuracy data point are retrieved and mapped to the tower region map. A set of high-accuracy records having the same or similar cell region pattern is preferably identified and subsequently used to calculate the anomaly score for the new data point.

In another example, the anomaly score can be calculated from a variance in the path from a straight line or deviation from known accessible geographic paths, such as streets, sidewalks, geographic features (e.g., bodies of water, etc.), or any other suitable known geographic limitation that precludes user access. The anomaly score can alternatively be calculated by mapping each location data point to the tower region map, and for a given geographic point (e.g., a given longitude and latitude), looking at the number of data points associated with the geographic point.

The geographic location anomaly score can additionally or alternatively be calculated based on the density of historic device location data points that are associated with the respective geographic location. For example, geographic locations having a number or frequency of deviation of the point from immediately adjacent neighbors above a threshold number can be assigned a high anomaly score (e.g., is highly anomalous or suspect). The geographic location anomaly score can additionally or alternatively be calculated based on the density of historic device location data points associated with geographic points that are adjacent the given geographic location (secondary geographic locations). The secondary geographic locations are preferably immediately adjacent (e.g., contiguous with) the geographic location of interest, but can alternatively be regions adjacent the geographic region of interest, geographic locations within a predetermined geographic range (e.g., locations within a 5 mile radius of the geographic location of interest), or be any other suitable secondary geographic location. In one variation, the anomaly score of the geographic location is correlated with the difference between the number or frequency of data points associated with the geographic location of interest and the number or frequency of data points associated with secondary geographic locations. For example, the greater the difference between the two values, the higher and more anomalous the geographic location of interest is scored. Alternatively, the anomaly score of the geographic location can be determined based on the difference between the number or frequency of data points associated with the geographic location and the number or frequency of data points associated with the secondary geographic locations, wherein the anomaly score is calculated from the difference, proportion difference, or any other suitable value. Alternatively, the anomaly score of the geographic location can be determined based on the distribution of device data points within the area adjacent the geographic location. For example, geographic locations having a small variances (e.g., many data points in one area, surrounded by little to no data points in adjacent locations) can have high anomaly scores, while geographic locations having large variances (e.g., the difference in the number of data points between the geographic location and the adjacent locations is smaller than a predetermined threshold percentage or value) can have low anomaly scores. However, the anomaly score for each geographic location can be otherwise determined.

Figure 6:
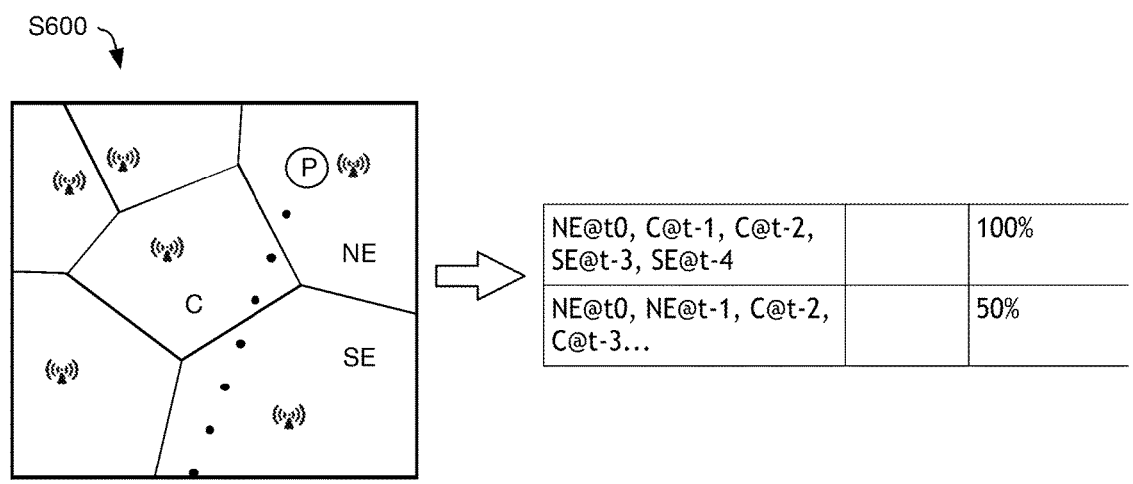
FIG. 6 is a schematic representation of an example of generating a probability tree, according to an embodiment.

The probability tree used with the method functions to determine what the probability of the reported location being the true device location is, given the historical locations of the device. FIG. 6 is a schematic representation of an example of generating the probability tree, according to an embodiment. Generating the probability tree S600 preferably includes determining the probability tree based on the source dataset and the map of cell regions, but can alternatively be determined in any other suitable manner. More preferably, the probability tree is determined from data points within the data set having an accuracy score above a threshold accuracy. However, the probability tree can be determined from data points having anomaly scores below a threshold anomaly value, from location records for devices wherein the proportion of reported locations for the device above the threshold accuracy is above a threshold proportion (e.g., 50%, 40%, 70%, etc.), or from any other suitable subset of the dataset. The data points used are preferably augmented with an anomaly score, but can alternatively be used without the anomaly score. As shown in FIG. 6, the probability tree is preferably generated by projecting the data points for the traversed path of a given device on the cell region map and determining which cell regions the traversed path crosses. This functions to determine what the traversed path would look like had only network-based tracking been available for the given device. The pattern of the traversed path is recorded, along with the relative and cumulative time between each data point. A progressively coarse index is then built for each data point, wherein the index predicts the subsequent possible locations a device can report with an associated confidence interval. The associated confidence level is preferably based on the number of cell region matches, or the length of the matched path. For example, a device record having 6 associated prior consecutive records that match a predetermined reference path (e.g., historical cell region traversal path of a high-accuracy device) can have a higher confidence level than a device record having only 2 associated prior consecutive records that match the reference path. Alternatively, locations that were actually subsequently reported by the given device can have high confidence levels, while locations that were not subsequently reported by the given device can have low confidence levels. Modifications to the observed traversed path (e.g., paths staying in one cell region longer than the observed traversed path) can additionally be made, wherein the associated confidence level can be lower than that assigned to the observed traversed path. For example, the confidence level for a given point can be discounted by a discount amount (e.g., reduced by 50%, reduced by 30%, etc.) for each modification to the observed path to said point. The discount amount can be predetermined, calculated based on the number or frequency of devices having the modified traversed path, or determined in any other suitable manner.

For example, as shown in FIG. 6, if the cells in the example are NE (northeast), C (center), and SE (southeast), and P is the northernmost sample, the index tracing the traversed path exactly can have a 100% confidence level, whereas a modified path including one modification (e.g., staying in C at t−2) would have a 50% confidence level.

Figure 7:
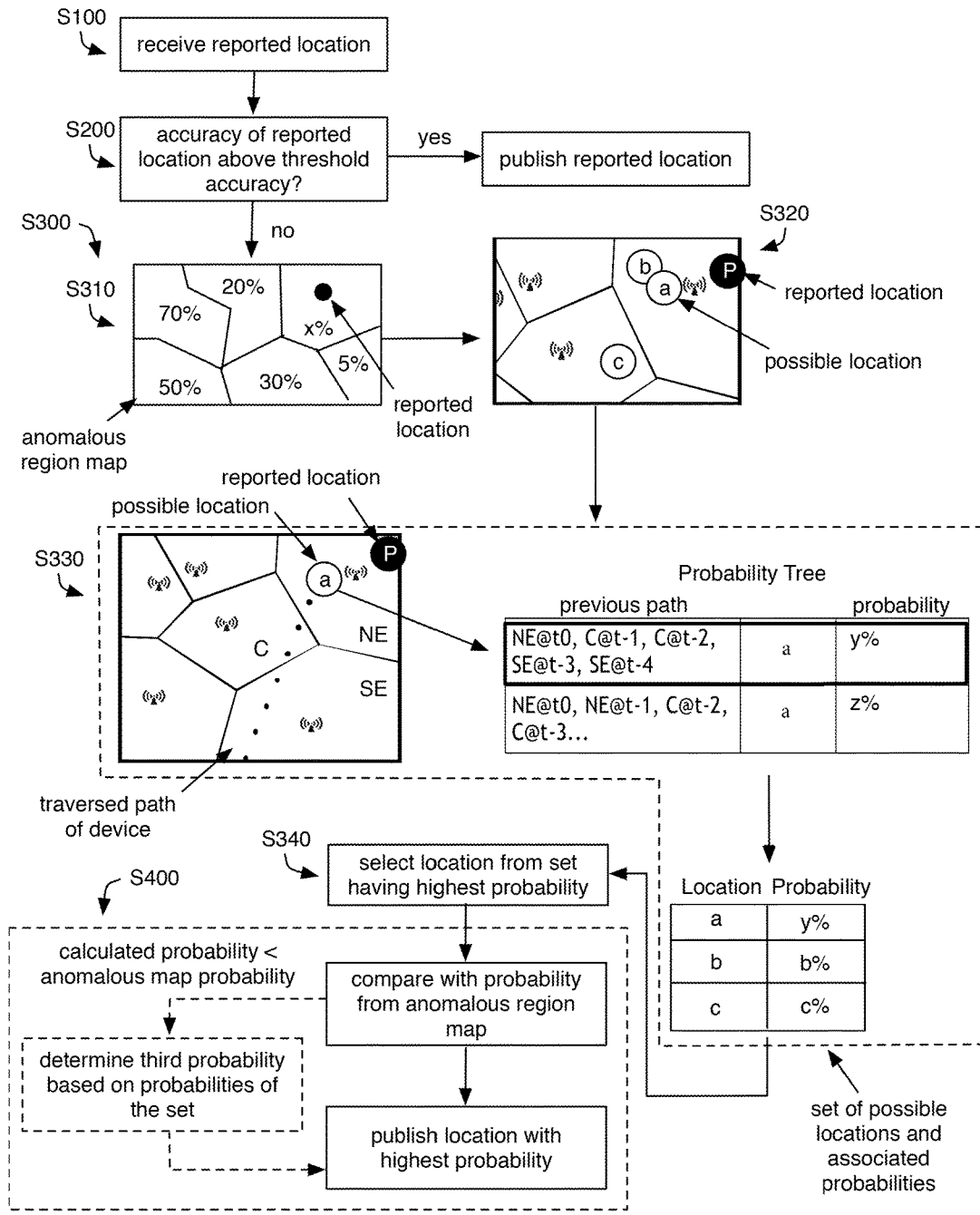
FIG. 7 is a schematic representation of an example of the method of correcting location data, according to an embodiment.

FIG. 7 is a schematic representation of an example of the method of correcting location data, according to an embodiment. In one embodiment, the process of FIG. 7 is performed by the location correction system. Other entities may perform some or all of the steps of the process in other embodiments. Likewise, embodiments may include different and/or additional steps, or perform the steps in different orders.

Receiving a reported location for a device S100 functions to receive a location for correction. The reported location is preferably received with a request for an advertisement, but can alternatively be received with or without any other accompanying request. The reported location can be received from the device, from a third party service that received the reported location, such as an advertisement exchange or a social networking system, or from any other suitable source. The reported location is preferably received at a computing system (e.g., a collection of networked processors or servers), but can alternatively be received at any other suitable system.

Determining whether the reported location accuracy is below a threshold accuracy S200 functions to determine whether the reported location should be corrected. The threshold accuracy is preferably predetermined by the system or by a user, but can alternatively be dynamically determined (e.g., based on the requirements of the third party site) or otherwise determined. The accuracy of the reported location is preferably determined from the reported accuracy (e.g., wherein the device data includes an accuracy field), or from the type of positioning mechanism reporting the location (e.g., wherein GPS data is always considered more accurate than the threshold accuracy), but can alternatively be otherwise determined. For example, if the reported location coincides with a cell site location or a suspected cell site location on the anomalous region map, then the accuracy of the reported location can be determined to be below the threshold location. In response to the accuracy of the reported location exceeding the threshold accuracy, the reported location is published. The device density map and/or tree can additionally be updated based on the accurate reported location. In embodiments, where the accuracy of the reported location is above the threshold accuracy the location correction system publishes the reported location. The reported location may be published to, for example, an ad exchange. The reported location may also be published to one or more third party systems. The third party systems might, for example, use the published location data to bid on ads. The published data may also be used by the location correction system as a clean location in subsequent location correction calculations. In some embodiments, the location correction system may score the reported location prior to publishing. The score indicating a level of accuracy of the reported location. The location correction system then includes the score with the published reported location. In response to the accuracy of the reported location falling below the threshold accuracy, a corrected location can be determined for the device, wherein the corrected location can be published in lieu of the reported location.

Determining S300 a corrected location functions to determine a more accurate location for the device, based on the historical locations and traversed paths of a population of devices. Determining S300 the corrected location preferably includes determining S310 the probability that the reported location represents the true device location, determining S320 a set of possible geographic locations for the device, determining S330 the probability that the possible location is the true location of the device for each of the set of possible locations, and selecting S340 the possible location within the set having the highest probability, wherein the highest probability is a second probability.

Determining S310 the probability that the reported location represents the true device location functions to determine whether the reported location should be published as the representative location. The probability that the reported location represents the true location is preferably determined based on the anomalous region map, an example of which is shown in FIG. 7, but can be otherwise determined. The reported location is preferably projected onto the anomalous region map and the probability associated with the corresponding location assigned to the reported location (first probability). However, the probability that the reported location represents the true device location can be otherwise determined. In this example, the probability associated with the corresponding location assigned to the reported location (first probability) is x %.

Determining S320 a set of possible geographic locations for the device is preferably based on a device density map and the timestamp of the reported location functions to identify the set of possible geographic locations that the device could be located in. Determining the set of possible geographic locations for the device can additionally include intersecting the values with the tower region map to further reduce the number of possible geographic locations that the device can be located in. The device density map corresponding to the timestamp at which the location was reported (e.g., recorded at the device) is preferably used to determine the set of possible geographic locations. For example, the device density map for the time of day corresponding to the timestamp can be used. In another example, the device density map for the day of the week corresponding to the timestamp can be used. In another example, the cell distribution for the specific day of the year can be used. However, device density maps for any other suitable time period can be used. The device density map preferably identifies historic device locations within one or more cell regions, wherein the historic device locations form the set of possible geographic locations for the device.

Determining S330 the probability that the possible location is the true location for the device for each of the set of possible locations functions to determine which of the locations in the identified set most likely represents the true device location, an example of which is shown in FIG. 7. The probability that the possible location is representative of the true location is calculated for each of the possible locations in the identified set. The probability that the possible location is representative of the true location is preferably calculated based on the location history for the device from which the reported location is received and the probability tree, generated from historically traversed paths of known accurate data, but can alternatively be calculated in any other suitable manner. For example, the recent history of reported locations (e.g., cell regions) for the device can be determined and the traversed path estimated. The traversed path of the device can be indexed to the observed traversed paths of historical accurate data through the cell regions, and the probability that each of the possible locations could be the next reported location is determined based on the observed traversed path of the historical accurate data. The traversed path of the device is preferably indexed to the observed traversed path having the longest sequential or highest number of matched points, but can alternatively be indexed any other suitable traversed path. When the traversed path of the device is indexed to multiple observed traversed paths, the probability that the possible location is representative of the true location is preferably calculated based on the probabilities determined from the multiple observed traversed paths. The location probability can be calculated using a weighted geometric mean of the probabilities associated with the observed traversed paths, or otherwise determined. For example, if the device history includes three historic points, A, B, and C, and an observed traversed path also includes the three points, A, B, and C in the same order, then the observed traversed path is used to determine the estimated location and the associated probability. In another example, if the device history includes the three points A, B, and C, and a first observed path includes D, A and C and a second observed path includes D, B and C, then the weighted average of the probabilities that a given location is the true location can be determined based on the first observed path and the second observed path, respectively.

Selecting S340 the possible location of the set having the highest probability functions to identify the most likely location of the set to represent the true device location. The probability associated with the selected location is the second probability.

Publishing S400 a location for the device functions to publish a geographic location identifier that better approximates the true location of the device. The location may be published to, for example, an ad exchange. The location may also be published to one or more third party systems. The third party systems might, for example, use the published location data to bid on ads. The published data may also be used by the location correction system as a clean location in subsequent location correction calculations. In some embodiments, the location correction system may score the reported location prior to publishing. The score indicating a level of accuracy of the reported location. The location correction system then includes the score with the published reported location. The published location can be the received location, the selected location (e.g., location selected out of the set of possible locations), an average location, or any other suitable location. The published location is preferably the location having the highest probability of approximating the true location of the device, but can alternatively be any other suitable location. The location can additionally be published with the associated probability. In one variation of the method, if the second probability exceeds the first probability (e.g., x %), the selected location is published as the location for the device. If the first probability exceeds the second probability, the received location is published as the location for the device. In another variation of the method, if the second probability exceeds the first probability, the selected location is published as the location for the device. If the first probability exceeds the second probability, a third probability is calculated based on the probabilities of each of the set of possible locations. The third probability can be calculated by taking the mean or median of the probabilities associated with the set, or can be calculated using any other suitable method. If the third probability exceeds the first probability, then an averaged location (e.g., determined by averaging the locations weighted by the associated probabilities, averaging the locations, etc.) is published as the location for the device. If the first probability exceeds the third probability, the received location is published. However, any other suitable method of selecting the corrected location can be used.

An alternative embodiment preferably implements the above methods in a non-transitory computer-readable medium storing computer-readable instructions. The instructions are preferably executed by computer-executable components preferably integrated with a location correction system. The location correction system can include a cell region mapping system, probability determination system, and location selection system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for correcting location data. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details disclosed herein.

The invention claimed is:

1. A computer-implemented method for correcting location data, comprising:
    receiving a reported location of a mobile device;
    determining a set of possible geographic locations for the mobile device based at least in part on the reported location and a device density map describing a historical distribution of mobile devices over a geographic region;
    determining a probability for each location in the set of possible geographic locations, each probability indicating a likelihood that an associated possible geographic location represents a true location of the mobile device, wherein determining the probability comprises:
        determining a traversed path of the mobile device based on previously determined locations of the mobile device through one or more cell regions, of a plurality of cell regions, that together cover the geographic region, determining one or more historical paths that traverse one or more of the cell regions, and have at least one cell region in common with the traversed path, and determining a probability that a location in the set of possible geographic locations is the true location based on comparisons between the one or more historical paths and the traversed path;

selecting a possible geographic location in the set responsive to the determined probabilities; and publishing the true location of the mobile device based at least in part on the selected possible geographic location.

2. The method of claim 1, further comprising:

determining a first probability that the reported location of the mobile device is the true location of the mobile device;

comparing the first probability to the probability associated with the selected possible geographic location; and determining the true location of the mobile device responsive to the comparison.

3. The method of claim 2, wherein determining the true location of the mobile device responsive to the comparison comprises:

determining the reported location of the mobile device as the true location of the mobile device responsive to the first probability exceeding the probability associated with the selected possible geographic location; and determining the selected possible geographic location of the mobile device as the true location of the mobile device responsive to the first probability not exceeding the probability associated with the selected possible geographic location.

4. The method of claim 2, wherein determining a first probability that the reported location of the mobile device is the true location of the mobile device comprises:

projecting the reported location onto an anomalous region map, the anomalous region map including a set of geographic locations that are each associated with a respective probability of how likely a particular geographic location is the true location of the mobile device; and determining the first probability responsive to the projection of the reported location on the anomalous region map.

5. The method of claim 1, wherein determining the set of possible geographic locations for the mobile device based at least in part on the reported location and the device density map further comprises:

retrieving a time stamp associated with the reported location;

filtering the device density map based on the time stamp so that the historical distribution of mobile devices over the geographic region represents a period of time inclusive of the time stamp; and determining the set of possible geographic locations from the filtered historical distribution of mobile devices over the geographic region.

6. The method of claim 1, further comprising:

determining a first probability that the reported location of the mobile device is the true location of the mobile device;

determining a second probability based on the determined probabilities for each of the set of possible geographic locations;

determining that the second probability exceeds the first probability; and responsive to determining that the second probability exceeds the first probability, generating an averaged location of the mobile device based in part on averaging one or more locations in the set of possible geographic locations, wherein the averaged location is the published true location of the mobile device.

7. A non-transitory computer-readable storage medium storing executable computer program instructions for correcting location data, the instructions executable to perform steps comprising:

receiving a reported location of a mobile device;

determining a set of possible geographic locations for the mobile device based at least in part on the reported location and a device density map describing a historical distribution of mobile devices over a geographic region;

determining a probability for each location in the set of possible geographic locations, each probability indicating a likelihood that an associated possible geographic location represents a true location of the mobile device, wherein determining the probability comprises:

determining a traversed path of the mobile device based on previously determined locations of the mobile device through one or more cell regions, of a plurality of cell regions, that together cover the geographic region, determining one or more historical paths that traverse one or more of the cell regions, and have at least one cell region in common with the traversed path, and determining a probability that a location in the set of possible geographic locations is the true location based on comparisons between the one or more historical paths and the traversed path;

selecting a possible geographic location in the set responsive to the determined probabilities; and publishing the true location of the mobile device based at least in part on the selected possible geographic location.

8. The computer-readable medium of claim 7, further comprising:

determining a first probability that the reported location of the mobile device is the true location of the mobile device;

comparing the first probability to the probability associated with the selected possible geographic location; and determining the true location of the mobile device responsive to the comparison.

9. The computer-readable medium of claim 8, wherein determining the true location of the mobile device responsive to the comparison comprises:

determining the reported location of the mobile device as the true location of the mobile device responsive to the first probability exceeding the probability associated with the selected possible geographic location; and determining the selected possible geographic location of the mobile device as the true location of the mobile device responsive to the first probability not exceeding the probability associated with the selected possible geographic location.

10. The computer-readable medium of claim 8, wherein determining a first probability that the reported location of the mobile device is the true location of the mobile device comprises:

projecting the reported location onto an anomalous region map, the anomalous region map including a set of geographic locations that are each associated with a respective probability of how likely a particular geographic location is the true location of the mobile device; and determining the first probability responsive to the projection of the reported location on the anomalous region map.

11. The computer-readable medium of claim 7, wherein determining the set of possible geographic locations for the mobile device based at least in part on the reported location and the device density map further comprises:
   retrieving a time stamp associated with the reported location;
   filtering the device density map based on the time stamp so that the historical distribution of mobile devices over the geographic region represents a period of time inclusive of the time stamp; and
   determining the set of possible geographic locations from the filtered historical distribution of mobile devices over the geographic region.

12. The computer-readable medium of claim 7, further comprising:
   determining a first probability that the reported location of the mobile device is the true location of the mobile device;
   determining a second probability based on the determined probabilities for each of the set of possible geographic locations;
   determining that the second probability exceeds the first probability; and
   responsive to determining that the second probability exceeds the first probability, generating an averaged location of the mobile device based in part on averaging one or more locations in the set of possible geographic locations, wherein the averaged location is the published true location of the mobile device.

13. A location correction system comprising:
   a processor; and
   a non-transitory computer-readable storage medium coupled to the processor, the computer-readable storage medium including instructions that, when executed by a processor, cause the system to:
      receive a reported location of a mobile device;
      determine a set of possible geographic locations for the mobile device based at least in part on the reported location and a device density map describing a historical distribution of mobile devices over a geographic region;
      determine a probability for each location in the set of possible geographic locations, each probability indicating a likelihood that an associated possible geographic location represents a true location of the mobile device, wherein determining the probability comprises:
         determining a traversed path of the mobile device based on previously determined locations of the mobile device through one or more cell regions, of a plurality of cell regions, that together cover the geographic region,
         determining one or more historical paths that traverse one or more of the cell regions, and have at least one cell region in common with the traversed path, and
         determining a probability that a location in the set of possible geographic locations is the true location based on comparisons between the one or more historical paths and the traversed path;
      select a possible geographic location in the set responsive to the determined probabilities; and
      publish the true location of the mobile device based at least in part on the selected possible geographic location.

14. The system of claim 13, wherein the instructions, when executed by a processor, further cause the system to:
   determine a first probability that the reported location of the mobile device is the true location of the mobile device;
   compare the first probability to the probability associated with the selected possible geographic location; and
   determine the true location of the mobile device responsive to the comparison.

15. The system of claim 14, wherein the instructions, when executed by a processor, further cause the system to:
   determine the reported location of the mobile device as the true location of the mobile device responsive to the first probability exceeding the probability associated with the selected possible geographic location; and
   determine the selected possible geographic location of the mobile device as the true location of the mobile device responsive to the first probability not exceeding the probability associated with the selected possible geographic location.

16. The system of claim 14, wherein the instructions, when executed by a processor, further cause the system to:
   project the reported location onto an anomalous region map, the anomalous region map including a set of geographic locations that are each associated with a respective probability of how likely a particular geographic location is the true location of the mobile device; and
   determine the first probability responsive to the projection of the reported location on the anomalous region map.

17. The system of claim 13, wherein the instructions, when executed by a processor, further cause the system to:
   retrieve a time stamp associated with the reported location;
   filter the device density map based on the time stamp so that the historical distribution of mobile devices over the geographic region represents a period of time inclusive of the time stamp; and
   determine the set of possible geographic locations from the filtered historical distribution of mobile devices over the geographic region.

\* \* \* \* \*